United States Patent [19]
Tomecek

[11] 3,719,787
[45] March 6, 1973

[54] TURN SIGNAL APPARATUS WITH IMPROVED SWITCH STRUCTURE AND PRINTED CIRCUIT BOARD

[76] Inventor: Jerry J. Tomecek, 1330 Dorre, Troy, Mich. 48084

[22] Filed: June 1, 1971

[21] Appl. No.: 148,855

Related U.S. Application Data

[63] Continuation of Ser. No. 23,937, March 30, 1970, abandoned.

[52] U.S. Cl.............................200/61.27, 200/61.34
[51] Int. Cl..............................................H01h 3/16
[58] Field of Search....................200/61.27–61.38, 200/61.54–61.57

[56] References Cited

UNITED STATES PATENTS

| | | |
|---|---|---|
| 2,652,553 | 9/1953 | Hollins...........................200/61.27 |
| 2,786,107 | 3/1957 | Grace............................200/61.27 X |
| 2,800,542 | 7/1957 | Barcus et al....................200/61.34 |
| 2,802,075 | 8/1957 | Spicer, Jr. et al...............200/61.34 |
| 2,817,728 | 12/1957 | Gurney..........................200/61.27 X |
| 3,089,923 | 5/1963 | Wright......................200/11 TW UX |
| 2,728,825 | 12/1955 | Lincoln et al. ..................200/61.34 |
| 2,800,541 | 7/1957 | Brown et al. ...................200/61.34 |
| 3,359,384 | 12/1967 | Nevett..........................200/61.34 |
| 3,531,603 | 9/1970 | Ashman .............................200/11 |
| 3,542,981 | 11/1970 | Wilkinson .........................200/61.3 |

*Primary Examiner*—J. R. Scott
*Attorney*—J. King Harness et al.

[57] ABSTRACT

There is herein disclosed a control switch unit for association with the steering column of a vehicle and comprising a one-piece plastic housing member which mounts a plurality of switches, including a turn signal and/or lane change indicating switch and an emergency signal switch, for association with a printed circuit board forming an integral part of the unit.

25 Claims, 7 Drawing Figures

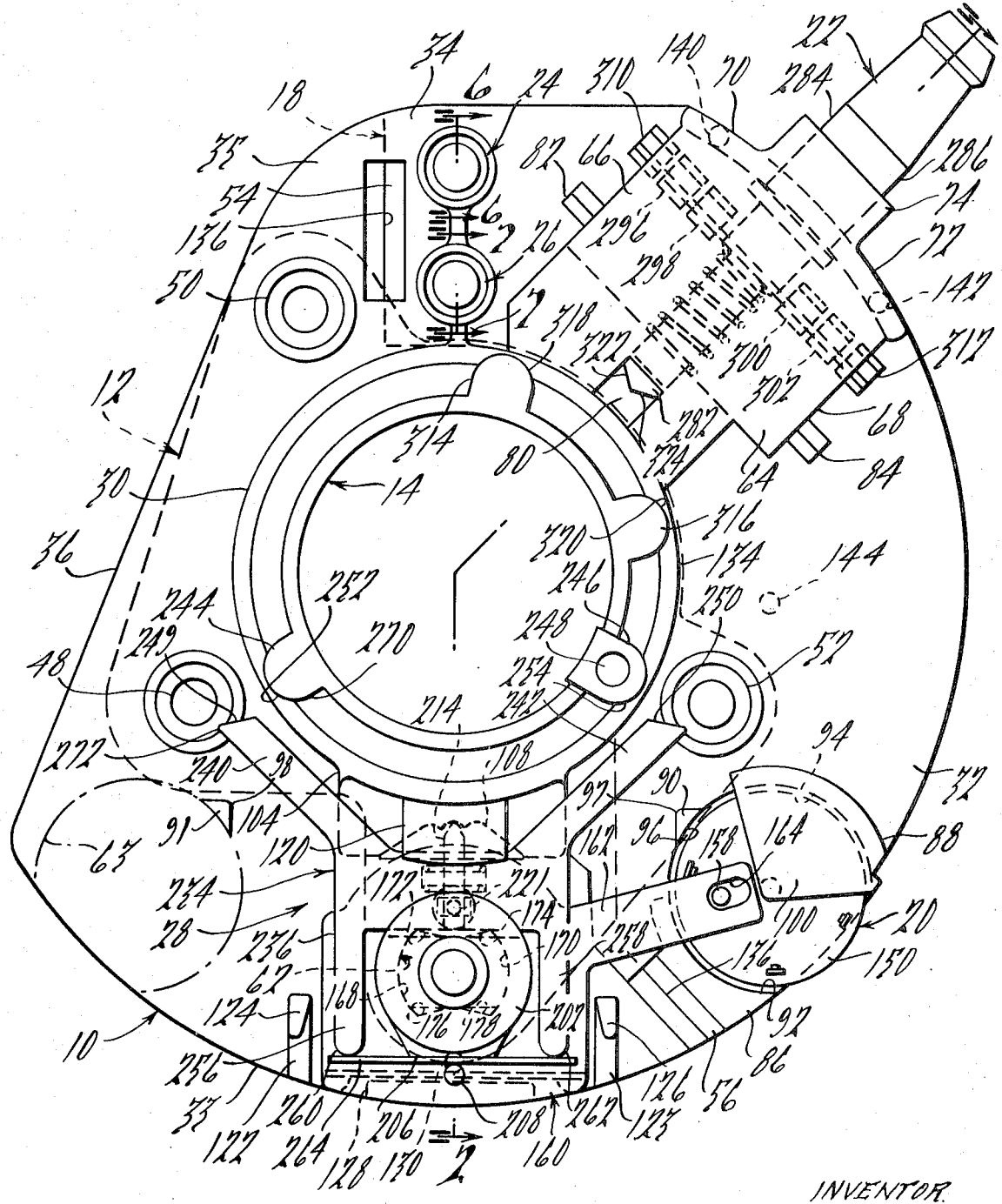

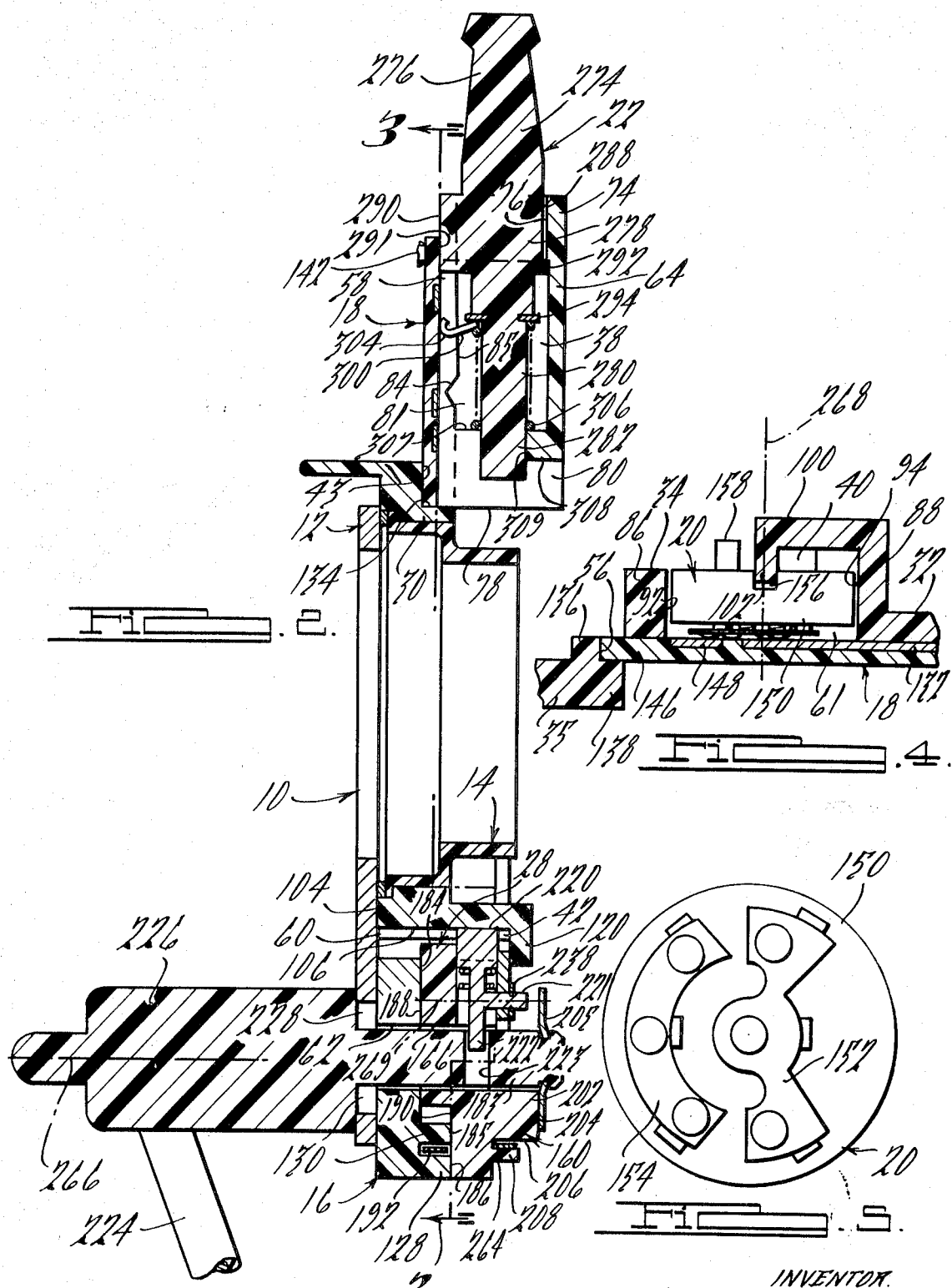

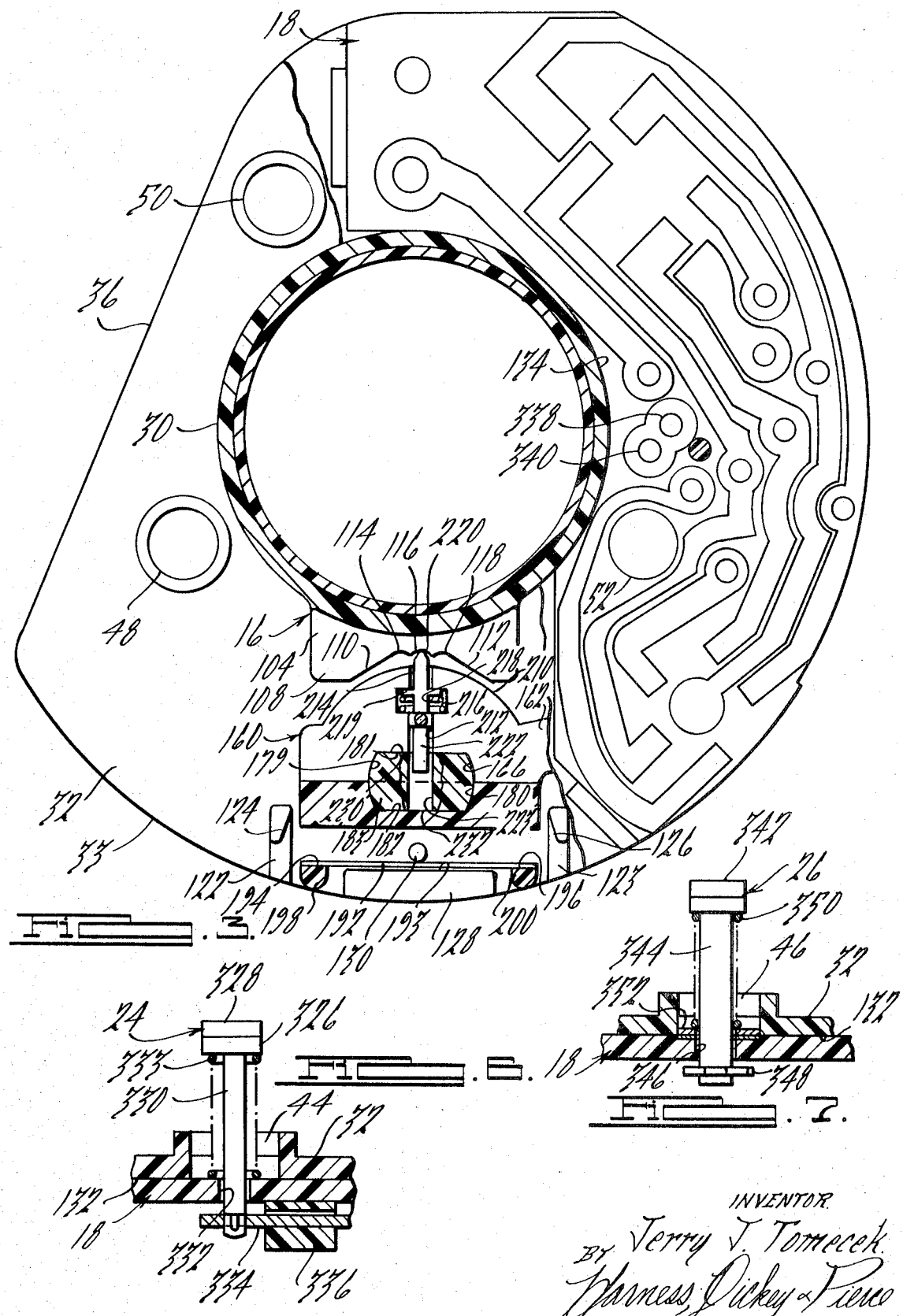

3,719,787

TURN SIGNAL APPARATUS WITH IMPROVED SWITCH STRUCTURE AND PRINTED CIRCUIT BOARD

BACKGROUND AND SUMMARY OF INVENTION

This application is a continuation of my prior copending application (now abandoned) Ser. No. 23,937 filed Mar. 30, 1970, for Turn Signal Apparatus.

For some time the automotive industry has been trying to develop direction signaling apparatus which meets all safety requirements, which is reliable in use, which is of low manufacturing cost, and which is easily assembled and installed. The primary object of the present invention is to provide a new control switch assembly which fulfills the aforementioned requirements. Among the many problems encountered with prior art apparatus of this general type, this invention is of particular significance with respect to reduction in the number of parts and with respect to establishing operational relationships between the various parts which insure reliable operation with a minimum of replacement of parts due to wear and breakage. The invention provides a one-piece plastic housing for all of the moving switch and contact parts and a printed circuit board on which all of the control circuitry may be located. The plastic material may be of any suitable heat resistance composition providing rigid support and anti-friction bearing surfaces for the movable parts while insulating the various electrical components. The present invention enables standardization of switch and contact parts with variations in control circuits for different vehicle models and accessories being accommodated with a minimum of change in control unit structure. Many changes may be accomplished by simply changing the control circuits of the printed circuit board. One of the features of the present invention is a new and improved control apparatus for manually actuating directional signaling switch apparatus to an on position and thereafter automatically returning the switch apparatus to an off position. It is to be understood that the terms such as "turn indicating" switch, or "turn signaling" or "lane changing", and the like, are used hereinafter in a generic sense to include any directional signaling apparatus of the general type to which this invention relates.

BRIEF DESCRIPTION OF THE DRAWINGS

FIG. 1 is a plan view of a switch control unit embodying the inventive concepts;

FIG. 2 is a sectional view of the apparatus shown in FIG. 1 as taken along line 2—2;

FIG. 3 is another sectional view of the apparatus of FIG. 1, with parts broken away, as taken along the line 3—3 in FIG. 2;

FIG. 4 is a sectional view of a portion of the apparatus of FIG. 1 taken along the line 4—4;

FIG. 5 is an enlarged end view of a portion of the apparatus shown in FIG. 4; and FIGS. 6 and 7 are enlarged cross-sectional views taken along the lines 6—6 and 7—7, respectively, in FIG. 1.

DETAILED DESCRIPTION

In General

Referring now to FIGS. 1 and 2, the inventive principles are embodied in a control assembly 10 adapted to be associated with a vehicle steering column by steering column attachment plate means 12 and steering column attachment ring means 14. A switch and control housing means 16 supports circuit means 18, in the form of a printed circuit board, turn indicating switch means 20, emergency flasher switch means 22, horn control contact means 24, cruise control contact means 26, and turn signal switch actuating means 28.

The Switch And Control Housing Means

The housing means 16 is in the form of a one-piece molded plastic member having a central hub portion 30 which rotatably supports the attachment ring means 14. A flange portion 32 extends generally radially and circumferentially relative to the hub portion and terminates in a generally circular rim 33. A printed circuit board mounting section 34 of the flange portion is axially offset relative to a section 35 of the flange portion. A chordal section 36 of the rim provides space for a conventional rack and gear-type steering column lock (not shown). An emergency switch mounting space 38, FIG. 2, a turn indicating switch mounting space 40, FIG. 4, an actuating means mounting space 42, FIG. 2, a printed circuit board mounting space 43, a horn contact mounting space 44, FIG. 6, and a cruise control contact mounting space 46, FIG. 7, are integrally formed in the housing member. Also, holes 48, 50, 52 are provided for fastening means (not shown) adapted to be mounted in corresponding holes in the attachment plate 12 to fixedly secure the control assembly within the steering column. Core slots 54, 56, 58, 60, 61 are provided as necessary to permit utilization of straight draw molding procedures during manufacture of the housing member. A shaft hole 62 is centrally located relative to mounting space 42. As an alternative arrangement, another switch mounting space 63, indicated in phantom, may be provided on the opposite side of the actuating space 42.

The emergency switch mounting space 38 is formed by a generally radially extending axially offset portion of the housing member comprising a top wall 64, radially extending side walls 66, 68, outer end wall portions 70, 72 forming a hub portion 74 having a generally U-shaped guide opening 76 and an inner end wall portion 78 having a guide opening 80. Slots 81 are provided in the side walls 66, 68 to provide access to triangularly-shaped detent cavities 82, 84 formed in the adjacent flange surface 85 which is upwardly inclined to provide an increasing resistance force to movement of the emergency switch to the on position. A slot 80 permits the inner end of the emergency switch 22 to be operatively associated with the ring 14 in the on position.

The turn indicating switch mounting space 40, as well as the aforementioned alternative mounting space 63, is formed by axially extending abutment walls 86, 88, 90 which have inner side surfaces 92, 94, 96 located on the rim and forming an extension of a circular opening 61 in the flange portion 32. The wall 90 and a corresponding wall 91 on the opposite side of the switch actuating means 28 also provide additional abutment surfaces 97, 98 for a purpose to be hereinafter described. A triangularly-shaped retaining flange 100 extends over a portion of the mounting space from the abutment wall 94. An integral stub shaft spindle 102 extends from the bottom of the flange 100 at the center of the mounting space to rotatably engage and locate the turn signal switch 20. As an alternative arrangement the spindle 102 may be formed on the switch 20 and engage a spindle hole in the flange 100.

The actuating means mounting space 42 is formed in part by a radially enlarged and axially extended hub portion 104 as shown in FIG. 2. The side surface 106 is provided with a recessed detent portion 108 defined by converging side wall portions 110, 112, FIG. 1, which terminate in three curved seats 114, 116, 118. The center of seat 116 is located on a radial line and the centers of seats 114, 118 are equally offset on opposite sides of the center of seat 116 and located on center lines which cross the radial line at a common point. A retaining flange 120 extends radially from hub portion 104 over a portion of the mounting space 42. The mounting space 42 is further defined by a pair of spaced locating ribs 122, 123, FIG. 1, which extend axially from the flange portion 32 adjacent the rim 34 and provide inclined abutment surfaces 124, 126. An abutment wall 128 is located opposite the hub portion 104 adjacent the rim 34 and in spaced relationship to a pin-like member 130 so as to define a spring blade retaining slot therebetween.

The printed circuit board mounting space 43 comprises a flat side surface 132 of the flange portion 32 corresponding in size and shape to the printed circuit board which is of generally arcuate segmental shape. An inner circumferentially extending abutment wall 134 extends around a segment of the hub portion 30 of approximately 135°. Combination retaining flanges and abutment wall members 136, 138, FIG. 4, are integrally formed between the offset flange sections at opposite ends of the surface 132.

Circuit Means

The circuit means comprises a one-piece printed circuit board of segmental shape which is attached to and supported by the side surface 132 of housing flange portion 32 and the side wall 134 of housing hub portion 30. The circumferentially spaced opposite ends of the board are received against and beneath flange portions 136, 138 as shown in FIG. 4. In the presently preferred embodiment, the printed circuit board is heat staked to the flange portion 32 at one or more locations as indicated at 140, 142, 144. The board itself comprises a plastic base 146 of high temperature resistant material such as melamine and the circuits are formed metallic ribbons 148 of silver coated copper or the like treated to provide a silver sulfide wear surface. The top surface of the plastic base material and the top surface of the metallic ribbons are in the same plane so that the various switch circuits may readily slide into and out of engagement with the metallic ribbons. In the assembled position, the printed circuit board is an integral part of the assembly covering the open sides of the contact mounting spaces 44, 46, the open side of the emergency flasher mounting space 38, and the open side of the turn signal switch mounting space 40. The exposed conductor ribbons 148 are thus sandwiched between layers of plastic insulating material provided by flange portion 32 and base 146 except at the various switch and contact locations. The wire harness (not shown) may be connected to the printed circuit by wave soldering techniques.

Turn Indicating Switch Means

The turn indicating switch means 20 comprises a rotary switch assembly, FIGS. 4 and 5, in the form of a molded plastic disc 150 in which spring loaded metal contact elements 152, 154 are mounted for limited axial displacement to insure good electrical engagement with the printed circuits. The switch means is rotatable between circuit breaking and circuit making positions relative to the printed circuits to complete the circuit in a fully rotated position to provide turn signals and to also complete the circuit in a less than fully rotated position to provide lane change signals. A central bearing opening 156 receives the depending spindle 102 whereby the disc is rotatably supported in the switch mounting space 40 on the printed board. A connecting pin means 158 is integrally formed on the side surface of the disc adjacent and radially offset from the spindle opening 156. It is contemplated that an additional switch means (not shown) similar to the switch means 20 may be mounted in the additional mounting space 63 in an alternative arrangement.

Turn Signal Switch Actuating Means

The turn signal switch actuating means comprises a molded plastic control member 160 having an integral actuating arm 162 extending toward and overlapping the rotary switch means 20. Connecting means are provided in the form of an elongated slot means 164 in which the pin means 158 is received whereby rotary movement of the control member 160 causes rotary movement of the rotary switch means 20. If an additional switch means is mounted in the additional mounting space 63, another integral actuating arm is provided on the switch actuating means and connected to the additional switch means as previously described. A mounting hole 166 of somewhat rectangular cross-sectional configuration is provided in the center of the body portion of the control member 160 and is adapted to be aligned with hole 62 in the housing flange. As shown in FIG. 1, one set of opposite sides 168, 170 of the hole 62 in the housing flange are arcuate segments of common radius forming bearing surfaces. The other set of opposite hole sides are provided with inclined abutment surfaces 172, 174 and 176, 178. As shown in FIG. 3, the mounting hole 166 has a pair of opposite sides 179, 180 which correspond to the flange hole sides 168, 170, and a pair of opposite parallel hole sides 181, 182 which provide shaft abutment surfaces to transfer rotary forces between the control member and a control shaft 183 of similar cross-sectional configuration. The control member is rotatably slidably supported on axially offset housing flange surfaces 184, 185, 186 by a 360° circumferentially extending bearing surface 188 and by an axially offset bearing surface 190 which extends circumferentially approximately 180°. A spring blade 192 is mounted between pivot post 130 and the side surface 193 of abutment 128. The ends of the blade extend substantially beyond the rounded ends of the abutment and engage flat surfaces 194, 196 of abutments 198, 200 extending from opposite sides of surface 190 of the control member toward the housing flange portion 32. The control member further comprises an axially extending abutment portion 202 which provides an abutment surface 204 for shaft fastening means 205 and a spring blade abutment surface 206. A pivot post 208 extends parallel to and in centrally spaced relationship to the abutment surface 206. The side surfaces of the control member are engageable with abutment surfaces 124, 126 in the turn indicating positions to limit rotatable movement beyond those positions.

The radially innermost side surface 210 of the control member 160 is arcuate and spaced closely adjacent the surfaces 110–118 of housing hub portion 104. A radially extending centrally located pin slot 212 reciprocably slidably mounts a metallic detent pin 214 biased toward an extended position by a spring 216. The detent pin is located in the extended position by abutting engagement between a flange 218 and a shoulder 219. The nose portion 220 of the pin 214 is axially elongated, FIG. 2, and radially contoured, FIG. 1, to fit into the detent grooves 114, 116, 118 on the housing hub portion 104 and hold the actuating means relative thereto while permitting sliding movement relative thereto under application of force. The surfaces connecting seats 114, 116, 118 are contoured so as to require an increase in application of force to the detent pin as the pin approaches the turn indicating position whereby lane change indicating signals may be given without setting the pin in the seats 114, 118. A pivot post 221 integral with pin 214 extends outwardly from the pin slot 212 for a purpose to be hereinafter described. The end 222 of the pin is slidably received in a retaining slot 223 in the shaft 183.

The turn signal indicating switch actuating means further comprises manually operable means in the form of a conventional turn signal indicating lever 224 mounted in a rotatably molded plastic or metallic shaft member 226 from which shaft element 183 depends. The shaft member is rotatably supported on backup plate 12 with shaft extension 183 extending in sequence through hole 228 in the backup plate, the abutment and bearing hole 62 in the housing flange, and the mounting slot 166 in the control member. The arrangement is such that flat opposite side surfaces 230, 232 of the shaft extension 183 abut the diagonally opposite surfaces 172, 178 of the housing hole 62 in one turn indicating position and abut the other diagonally opposite surfaces 174, 176 of the housing hole 62 in the other turn indicating position. In each such position, the detent means is effective to hold the control element in the position until positively moved therefrom.

The turn signal indicating switch means further comprises automatic return means in the form of a somewhat H-shaped metallic yoke member 234 which is pivotally mounted on pivot post 221 and slidably secured on a bearing surface 236 on the control element by fastening means 238 and hub flange 120. Yoke member 234 has a pair of oppositely inclined lever portions 240, 242 which extend generally tangentially relative to the housing hub 30 and terminate generally radially opposite radially projecting cam means 244, 246 on the attachment ring 14. One of the cam means includes an attachment pin hole 248 by which turning movement of the steering wheel causes corresponding turning movement of the attachment ring. Inclined and curved cam surfaces 249, 250 on the ends of the lever arms 240, 242 are adapted to be engaged by one or the other of curved surfaces 252, 254 on the cam projections when the control element has been manually moved to either of the turn indicating positions as will be hereinafter described in further detail. The yoke member has a pair of spaced parallel extending spring abutment arms 256, 258 which surround the abutment portion 202 of the control element and terminate in rounded spring abutment surfaces 260, 262 mounted in abutting engagement with a spring blade element 264 mounted between pivot post 208 and abutment surface 206.

In operation, the actuating means 28 is normally in the neutral position shown in FIG. 1 with the nose portion of detent pin 214 engaging rounded detent slot 116. In order to actuate the turn indicating switch 20, lever 224 is manually moved about pin axis 266 which causes the shaft member 226 to rotate until shaft abutment surfaces 230, 232 engage hub flange abutment surfaces 172, 178 or 174, 176, respectively. At the same time, detent pin 214 is cammed rearwardly against the bias of spring 216 and rides over the intervening detent ridge into detent slot 114 or 118 where the spring 216 is effective to hold the detent pin in restraining engagement with the associated detent slot. As the control element 160 rotates, actuating arm 162 is effective to rotate the switch body 150 about axis 268 to the related right or left turn indicating position where contacts 152, 154 complete circuits on the printed circuited board 18 to obtain the desired turn indicating signal in the usual manner. The slot 164 accommodates the rotation of arm 162 and the switch body 150 about the different axes of rotation.

When the control element is manually rotated to the turn indicating position, it also carries the return yoke 234 into position for engagement of one of the arms 240, 242 with the cam projections 244, 246. The arrangement is such that engagement of the arms with the cam projections, as the wheel is turned in the direction of the indicated turn, will cause a pivoting action of the yoke about an axis 269 through the pivot post 221 with spring blade 264 urging the opposite one of the spring arms 256, 258 toward the set turn indicating position. Thus, during rotation of the wheel in the direction of the turn, the projection 244 will effectively bypass the yoke without causing release of the detent means. When the wheel is turned in the opposite direction at the completion of the indicated turn, the side surface 270 of the cam projection will directly abut the side surface 272 of the cam arm and exert a return force on the yoke member along a line extending approximately through the axis of rotation 269 of the yoke member. The direction of force is such as to slidably move the yoke member parallel to the pin slot 212 and release the detent pin 214 from the associated detent slot whereupon the spring blade 192 is effective through one of the abutments 198, 200 to move the control element to the central position. Return movement of the yoke is assisted and assured by rounded abutment surfaces 97, 98 one of which is moved into engagement with the side surface of the cam arm opposite the cam arm engaging projections 244 or 246 to cause an additional pivoting action of the yoke about the rounded abutment surface to further force the detent pin 214 toward the release position and to eliminate binding between the parts. The various spring elements are so designed as to effect the desired movement by making the control element spring 192 stiffer than the yoke spring 264.

The Emergency Flasher Switch Means

The emergency flasher switch means 22 comprises a molded plastic switch body 274 having a finger gripping portion 276, a guide and support portion 278, a contact carrying portion 280, and a return cam portion 282. The guide and support portion includes side wall surfaces 284, 286, a curved upper surface 288, and a flat bottom surface 290 slidably engageable by corresponding side surfaces of guide slot 76 and the adjacent side surface 291 of the printed circuit board. An abutment flange 292 engages a shoulder at the inner end of the guide slot to locate the switch body in the off position. A metallic contact blade 294 is staked on the switch body and includes a plurality of integral resilient contact fingers 296, 298, 300, 302 which terminate in rounded contact surfaces 304, as shown in FIG. 2, which engage the exposed circuit ribbons in the mounting space 38 and complete emergency flasher circuits operable in a conventional manner. A compression spring 306 is mounted circumjacent the switch body between the contact blade 294 and a shoulder 307 of a guide flange 308 providing an upper guide surface 309 for the inner end 282 of the switch body. Detent means are provided to hold the switch body in the on position in the form of detent fingers 310, 312 similar to the contact fingers and positioned outside the switch cavity for engagement with detent slots 82, 84.

In operation, the switch body is manually movable from the off position to the on position and held in the on position by the detent means. In the on position, the cam portion 282 is located radially inwardly of the housing hub 30 in the path of movement of cam portions 314, 316 which are integral with and carried by the attachment ring 14. Thus, as the attachment ring is rotated by rotation of the sterring wheel, cam surfaces 318, 320 are engageable with cam surfaces 322, 324 to move the switch body radially outwardly to release the detent means whereupon the spring 306 is effective to move the switch body to the off position.

The Horn Contact Means

The horn contact means 24, FIG. 6, comprises a T-shaped contact button 326 having a contact head 328 and a stem 330 extending through contact mounting space 44 in the housing flange and a stem hole 332 in the printed circuit board. A spring 333 biases the button outwardly. The contact button is conventionally connected by a lead wire 334 through a protective well 336 to one of a pair of horn contacts 338, 340 in the printed circuit board.

The Cruise Control Contact Means

The cruise control contact means, FIG. 7, comprises a T-shaped contact button having a contact head 342 and a stem 344 extending through contact mounting space 46 and a stem hole 346 in the printed circuit board. A suitable fastener 348 holds the contact button on the bottom of the printed circuit board against the bias of a compression spring 350 mounted between the head 342 and a washer 352. Electrical contact is established through an exposed portion of a ribbon circuit on the printed circuit board.

Summary of Advantages of Invention

One of the principal advantages of the present invention is a substantial reduction in the number of parts required to provide the required multiplicity of switching functions. The present invention reduces the number of parts by between 50 to 100 percent as compared with current commercial designs.

Another primary advantage of the present invention is the provision of a standardized assembly, the basic components of which may be utilized for all of a wide variety of switching arrangements utilized by the various automobile manufacturers. The use of a printed circuit board is particularly advantageous in this connection because various circuit configurations may be provided on a standardized size printed circuit board which will be associated with the other parts in the same manner regardless of variations in the circuitry.

Still another important advantage of the present invention resides in the provision of switch return means which are fully operative in all possible positions of the steering wheel and which is arranged and designed to eliminate breakage problems.

A further advantage is that assembly of the various parts is greatly simplified.

It is contemplated that the inventive principles and concepts herein disclosed may be variously otherwise embodied and it is intended that the following claims be construed to cover alternative embodiments except insofar as limited by the prior art.

I claim:

1. A vehicle control switch unit adapted to be mounted circumjacent the vehicle steering wheel column and comprising:

a housing means of plastic material comprising a hub portion adapted to be attached to the vehicle steering wheel column and a flange portion extending radially and circumferentially relative to said hub portion;

a switch retaining opening in said flange portion;

a printed circuit board means mounted in fixed abutting relationship with said flange portion and extending radially and circumferentially relative to said hub portion and covering said switch retaining opening, there being printed circuit-type contact ribbons integrally formed on said printed circuit board means and exposed in said switch retaining opening;

control switch means movably mounted in said switch retaining opening and retained between and supported by said flange portion and said printed circuit board means and having contact means movable into and out of engagement with said contact ribbons; and switch actuating means movably mounted on and supported by said housing means in circumferentially spaced relationship to and being operatively connected with said control switch means.

2. The invention as defined in claim 1 and wherein said control switch means comprises a rotary turn signal indicating switch.

3. The invention as defined in claim 2 and having an additional emergency flasher control switch means movably mounted on and supported by said housing means in circumferentially spaced relationship to said rotary turn signal indicating switch.

4. The invention as defined in claim 1 and wherein said switch actuating means comprises:
- a control member pivotally mounted on said housing means,
- a control arm on said control member extending circumferentially and operatively engaging said control switch means,
- detent means on said control member holding said control member in a neutral position and in right and left turn indicating positions,
- and steering column actuable release means pivotally mounted on said control member and operatively connected to said detent means to release said detent means to permit movement from the right and left turn indicating positions to the neutral position.

5. A control switch unit for association with the steering column of a vehicle comprising:
- housing means for supporting a plurality of switch assemblies,
- a central hub portion on said housing means having a central axis adapted to be mounted coincident with the central axis of the steering column,
- a flange portion on said housing means extending radially and circumferentially relative to said hub portion and defining axially offset relatively flat side surfaces terminating in a circumferentially extending rim,
- a steering column attachment ring rotatably mounted on said hub portion for rotative movement relative thereto,
- a printed circuit board mounting space provided on one side surface of said flange portion and extending radially and circumferentially relative to said hub portion,
- a printed circuit board mounted on the one side surface of said flange portion in said mounting space,
- an emergency flasher switch opening in said flange portion opposite a portion of said printed circuit board,
- emergency flasher circuit means on said printed circuit board and exposed in said emergency flasher switch opening,
- an emergency flasher switch retaining means on said flange portion adjacent said emergency flasher switch opening,
- an emergency flasher switch movably mounted in said emergency flasher switch opening by said emergency flasher switch retaining means for movement between an on position and an off position,
- emergency flasher contact means carried by said emergency flasher switch and contacting said emergency flasher circuit means through said emergency flasher switch opening to complete emergency flasher circuits in the on position,
- a turn signal switch opening in said flange portion opposite another portion of said printed circuit board and circumferentially spaced from said emergency switch opening,
- turn signal circuit means on said printed circuited board and exposed in said turn signal switch opening,
- turn signal switch retaining means on the other side surface of said flange portion adjacent said turn signal switch opening,
- a turn signal switch movably mounted in said turn switch opening by said turn signal switch retaining means for movement between an on position and an off position,
- turn signal contact means carried by said turn signal switch and contacting said turn signal circuit means through said turn signal switch opening to complete turn signal indicating circuits in the on position,
- a turn signal switch actuating means space provided on said flange portion in circumferentially spaced relationship to and adjacent said turn signal switch opening, an operating shaft opening extending through said flange portion and into said turn signal switch actuating means space,
- fixed detent means on said hub portion adjacent said turn signal switch actuating means space, manually operable rotatable operating shaft means mounted in said shaft opening and extending into said turn signal switch actuating means space,
- a control member pivotally mounted in the turn signal switch actuating means space and operatively connected to said turn signal switch and operable by said operating shaft means for movement from a neutral position to right and left turn indicating positions,
- control member spring means biasing the control member toward the neutral position,
- movable detent means movably mounted on said control member and being engageable with said detent means on said hub portion in a holding position to releasably hold said control member in the neutral position and the right and left turn indicating positions and being movable to a release position to permit movement therebetween, detent release means pivotally connected to said detent means on said control member and being movable to and from a release position,
- detent spring means biasing the detent means to the holding position,
- cam follower means operatively associated with said detent release means to cause movement of said detent means from the holding position to the release position,
- detent release spring means biasing the detent release means toward the release position, and
- cam means on said attachment ring engageable with the cam follower means associated with said detent release means upon reverse rotation of the steering column after completion of an indicated turn to cam the detent release means to the release position thereby permitting said control member spring means to return said control member to the neutral position and thereafter permitting said detent spring means to return said detent means to the holding position.

6. The invention as defined in claim 5 and wherein said emergency flasher retainer means comprises a radially extending guideway having side walls formed by flange means integral with said flange portion.

7. The invention as defined in claim 5 and there being emergency flasher detent means to releasably hold said emergency flasher switch in the on position, said detent means comprising detent slot means integrally formed in said housing means adjacent said emergency flasher switch opening, and detent spring means carried by said emergency flasher switch for retaining engagement with said detent slots means in the on position.

8. The invention as defined in claim 7 and wherein an inclined surface is provided on said flange portion adjacent said emergency flasher detent means to provide an increasing resistance force as said emergency flasher switch is moved toward the on position.

9. The invention as defined in claim 5 and wherein said turn signal switch retainer means comprises a guideway integrally formed on said flange portion.

10. The invention as defined in claim 5 and wherein said turn signal switch comprising a rotatable member and said turn signal retaining means comprising axially offset flange means extending across said turn signal switch opening, and spindle means supported by said flange means and rotatably supporting said rotatable member for movement between the on and off positions.

11. The invention as defined in claim 5 and wherein said fixed detent means comprises elongated axially extending slots facing said turn signal switch actuating means space and said movable detent means comprise an elongated pin means slidably mounted on said control member and having an elongated axially extending abutment releasably engageable with said axially extending slots.

12. The invention as defined in claim 5 and wherein said movable detent means comprise an elongated pin means slidably mounted on said control member and movable along a line extending radially from the center of rotation of said control member into and out of releasable engagement with said fixed detent means.

13. The invention as defined in claim 12 and further comprising pivotal connecting means between said detent release means and said movable detent means whereby radially directed forces on said detent release means are transmitted to said movable detent means through said pivotal connecting means.

14. The invention as defined in claim 13 and wherein said detent release means comprises a yoke member having a pair of oppositely extending control arms extending generally tangentially to said hub portion and terminating adjacent said attachment ring, said cam follower means being located on the ends of said control arms.

15. The invention as defined in claim 14 and there being pivot means on said housing means and located for abutting pivotal engagement with one of said control arms during camming engagement between the other of said control arms and said cam means whereby to cause pivotal movement of said yoke member toward the release position.

16. The invention as defined in claim 5 and there being a horn contact opening in said flange portion opposite said printed circuit board, horn contact circuitry on said printed circuit board, and horn contact means mounted in said horn contact opening to complete a horn circuit.

17. The invention as defined in claim 16 and there being a cruise control contact opening in flange portion opposite said printed circuit board, cruise control circuitry on said printed circuit board, and cruise control contact means mounted in said cruise control opening and connected to said circuit means on the other side of said flange portion.

18. The invention as defined in claim 5 and said control means being connected to said turn signal indicating switch by an arm extending generally radially relative to the center of rotation of said control member, and a pin and slot connection between said arm and said rotary switch.

19. A control switch assembly for association with the steering column of a vehicle comprising:
  housing means for supporting a turn indicating switch relative to the steering column,
  a turn signal switch mounted on said housing means for movement between an off position and right and left turn indicating positions,
  a manually operable turn signal switch actuating means mounted on said housing means and movable between a neutral off position and right and left turn indicating positions and being operatively connected to said turn signal switch to correspondingly move said turn signal switch between the off position and right and left turn indicating positions,
  fixed detent means on said housing means adjacent said turn signal switch actuating means,
  radially slidably movable detent means mounted on said turn signal switch actuating means and being releasably engageable with said fixed detent means in a holding position to releasably hold said turn signal switch actuating means in the neutral off position and the right and left turn indicating positions and being movable to a release position to permit movement therebetween, detent release means pivotally connected to said radially slidably movable detent means and being pivotally and slidably movable between a holding position and a release position,
  spring means associated with and biasing said turn signal switch actuating means and said detent means and said detent release means to the neutral off position and the holding position,
  cam follower means operatively associated with said detent release means to cause movement of said detent release means and said detent means from the holding position to the release position, and
  cam means operatively associated with the steering column engageable with the cam follower means associated with said detent release means upon reverse rotation of the steering column after completion of an indicated turn to cam the detent release means and the detent means to the release position thereby permitting said spring means to return said turn signal switch actuating means to the neutral position.

20. The invention as defined in claim 19 and wherein:

said turn signal switch being mounted on said housing means in circumferentially spaced relationship to said turn signal switch actuating means, and control arm means extending circumferentially between and operatively connecting said turn signal switch and said turn signal switch actuating means.

21. The invention as defined in claim 20 and wherein:

said turn signal actuating means is rotatably mounted about an axis extending parallel to the axis of the steering column, and said turn signal switch is rotatably mounted about another axis extending parallel to the axis of rotation of the steering column.

22. The invention as defined in claim 19 wherein:

said movable detent means comprises an elongated member slidably mounted on and movable with and relative to said turn signal switch actuating means into and out of releasable engagement with said fixed detent means.

23. The invention as defined in claim 22 and further comprising:

pivotal connecting means between said detent release means and said movable detent means whereby radially directed forces on said detent release means are transmitted to said movable detent means through said pivotal connecting means.

24. The invention as defined in claim 23 and wherein:

said detent release means comprises a yoke member having a pair of oppositely extending control arms extending generally tangentially to said hub portion and having said cam follower means thereon and terminating adjacent the steering column and the path of movement of the cam means thereon for engagement between said cam means and said cam follower means in the right and left turn indicating positions upon reverse rotation of the steering column after completion of an indicated turn.

25. The invention as defined in claim 24 and wherein in each of the turn indicating positions, one of said control arms is located adjacent and in the path of movement of the cam means and the other of said control arms is radially spaced away from and out of the path of movement of the cam means, and fixed pivotal abutment means engageable with the other of said control arms during camming engagement between the one of said control arms and the cam means whereby to cause pivotal movement of said yoke member forcing said movable detent means toward the release position.

* * * * *